United States Patent [19]
Chiou

[11] Patent Number: 6,055,267
[45] Date of Patent: Apr. 25, 2000

[54] EXPANDABLE ETHERNET NETWORK REPEATER UNIT

[75] Inventor: Bin-chi Chiou, Hsinchu, Taiwan

[73] Assignee: Winbond Electronics Corp., Taiwan

[21] Appl. No.: 08/951,874

[22] Filed: Oct. 17, 1997

[51] Int. Cl.$^7$ .................................................. H04B 3/36
[52] U.S. Cl. .............................................. 375/211; 370/401
[58] Field of Search .................................... 375/211, 212, 375/356, 358, 257; 370/246, 401, 445, 451, 407

[56] References Cited

U.S. PATENT DOCUMENTS

| | | | |
|---|---|---|---|
| 5,265,123 | 11/1993 | Vijeh et al. | 375/3 |
| 5,430,762 | 7/1995 | Vijeh et al. | 375/211 |
| 5,517,520 | 5/1996 | Chiou | 375/212 |
| 5,550,803 | 8/1996 | Crayford et al. | 370/246 |
| 5,566,160 | 10/1996 | Lo | 370/246 |
| 5,606,664 | 2/1997 | Brown et al. | 370/407 |
| 5,754,540 | 5/1998 | Liu et al. | 375/211 |

*Primary Examiner*—Tesfaldet Bocure
*Attorney, Agent, or Firm*—Proskauer Rose LLP

[57] ABSTRACT

A repeater includes two or more repeater units. Each repeater unit transmits signals to and receives signals from a bus; each repeater unit is also connected to a distributed network status indicator (DNSI). The DNSI responds to status signals from the connected repeater unit and other DNSIs to generate global network status signals. These global network status signals are transmitted to other DNSIs and in turn are transmitted to other repeater units. These global network status signals coordinate the repeater units to function as a single repeater according to the IEEE 802.3 Standard.

11 Claims, 13 Drawing Sheets

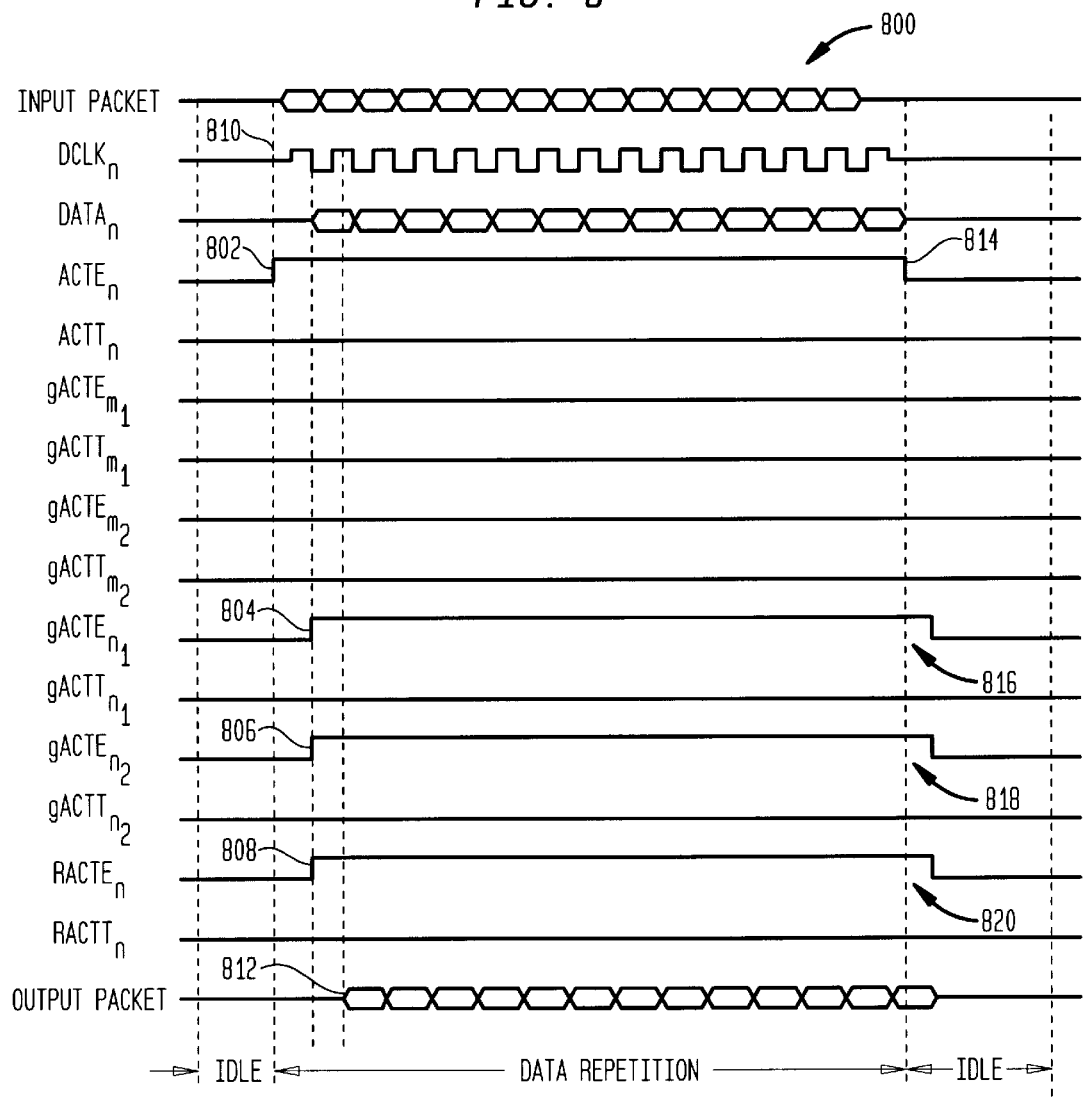

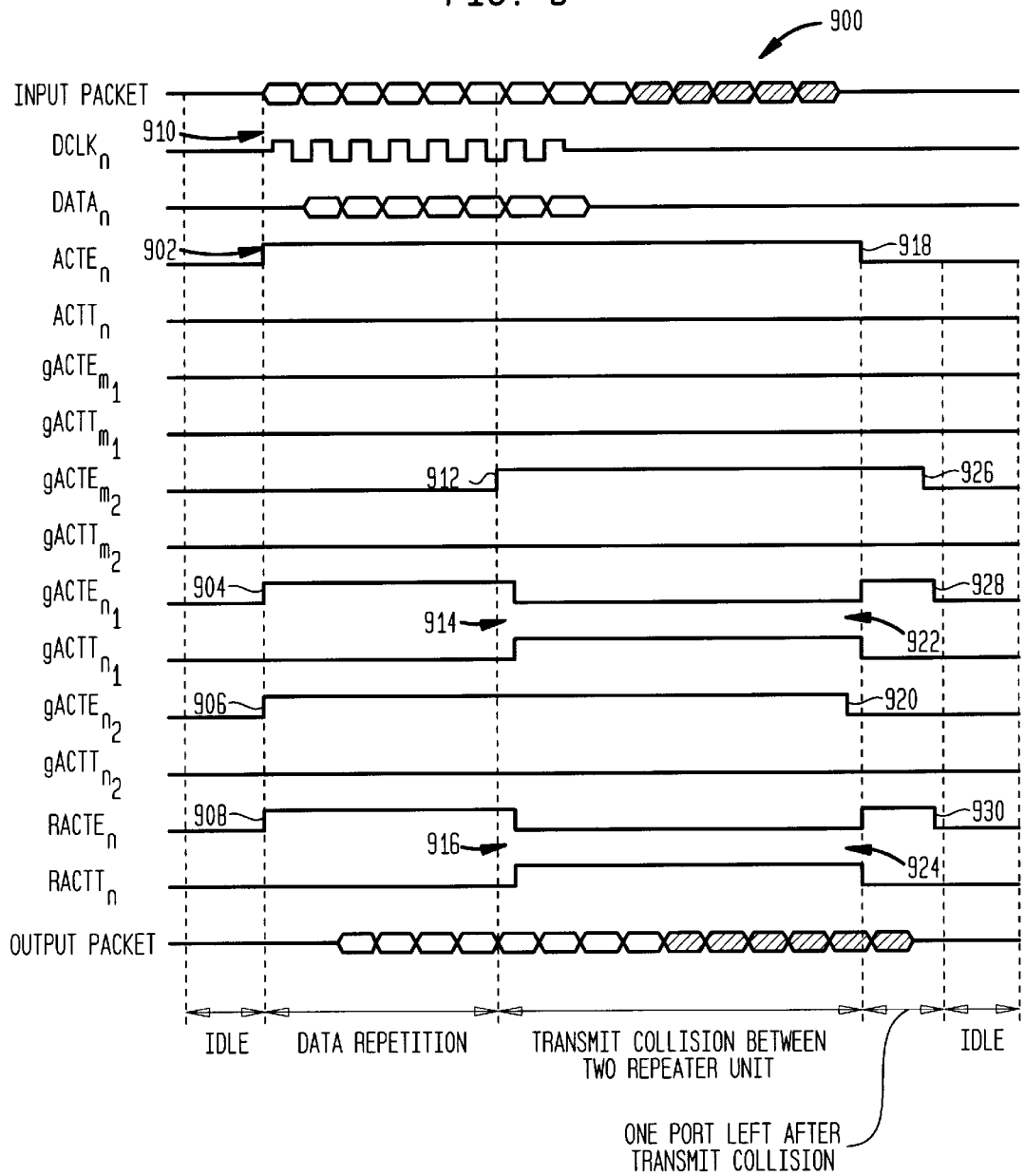

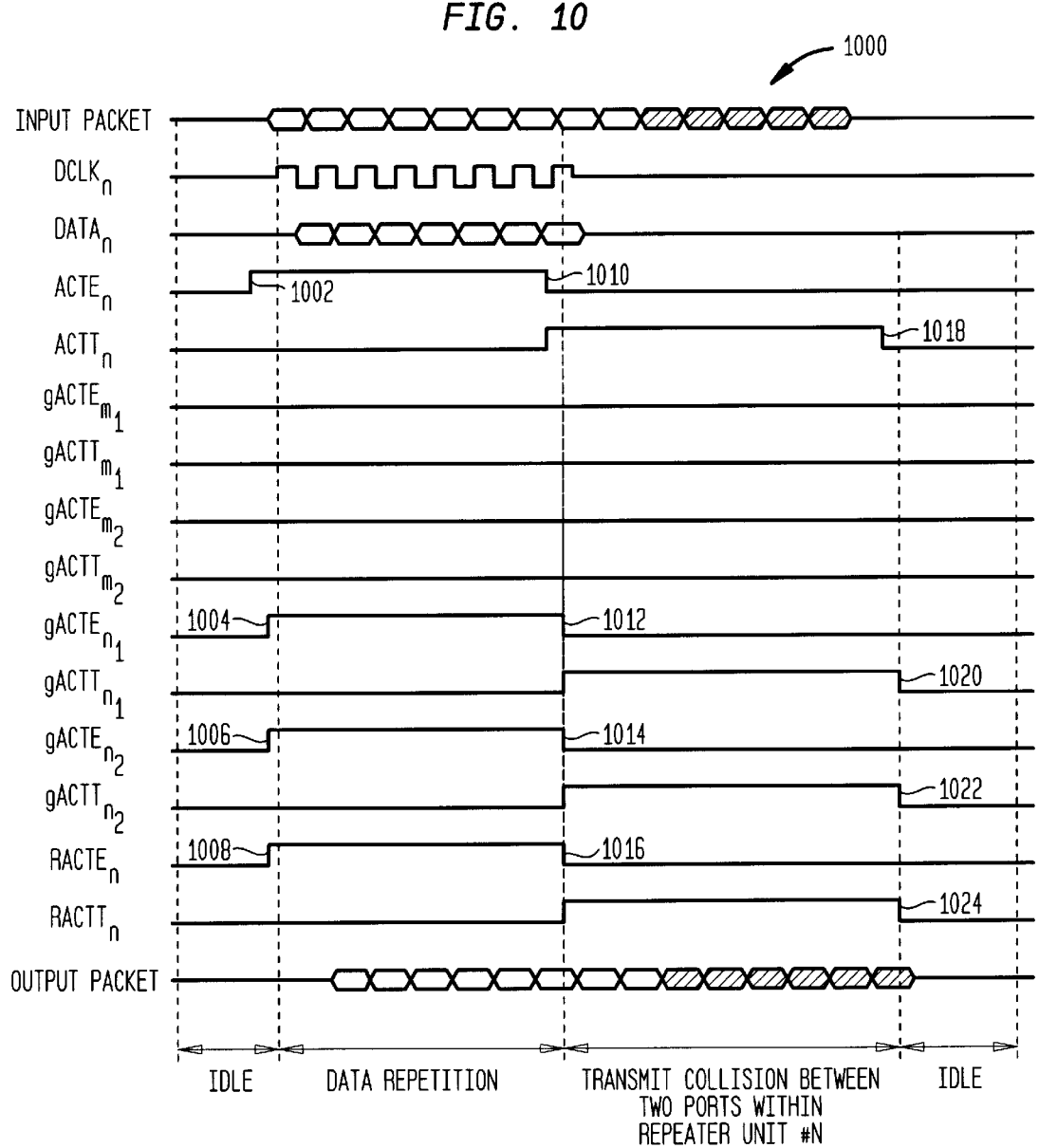

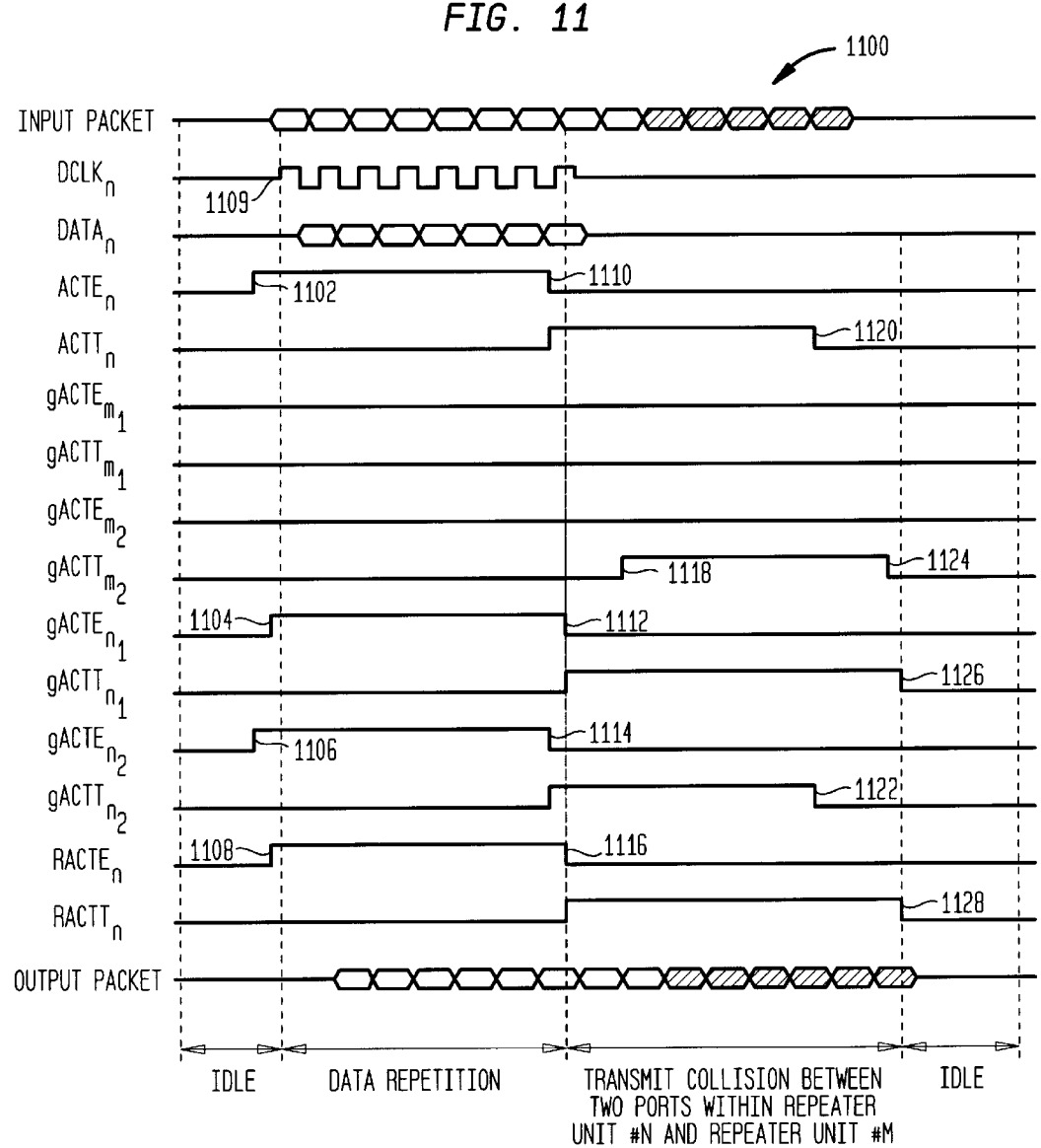

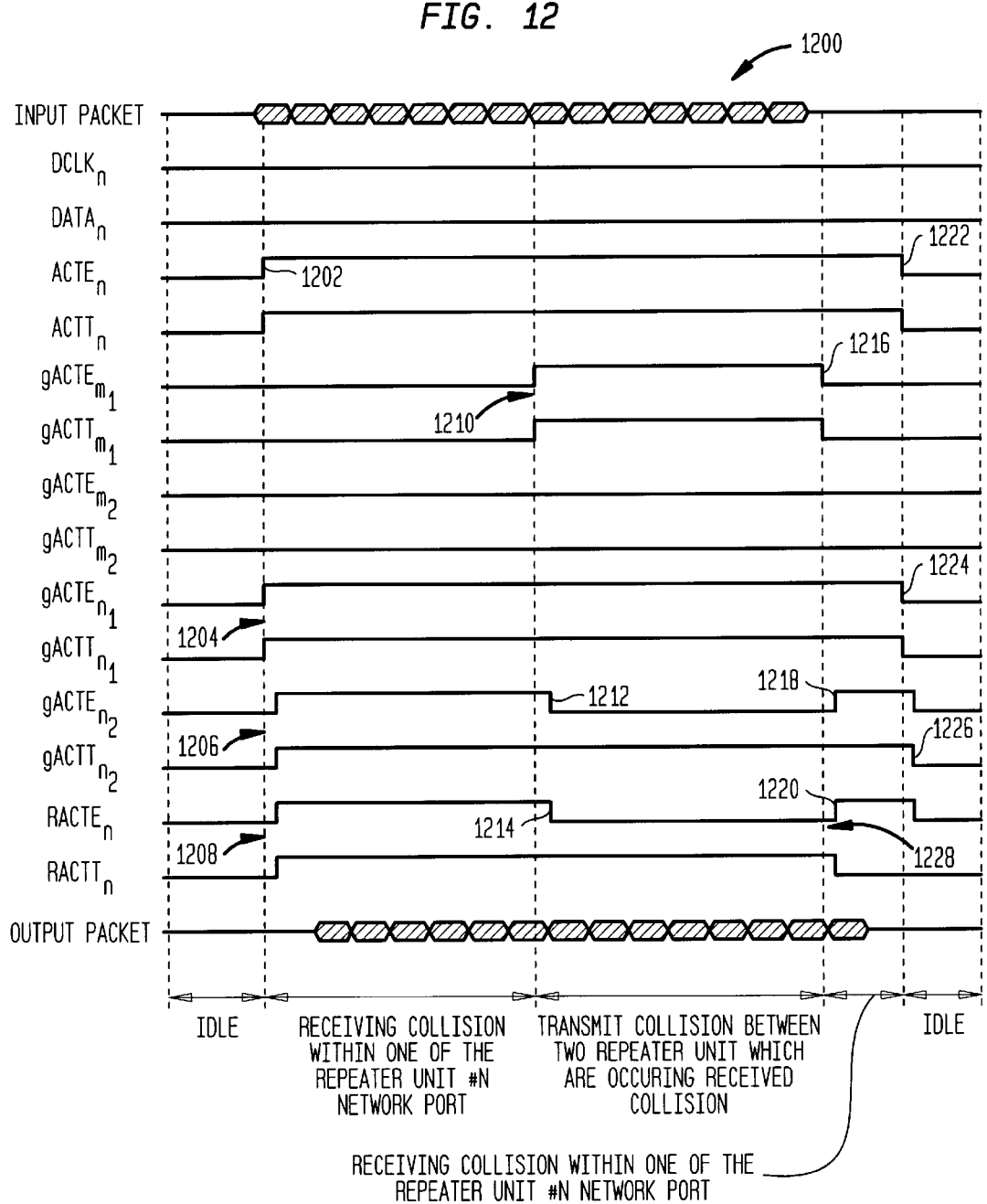

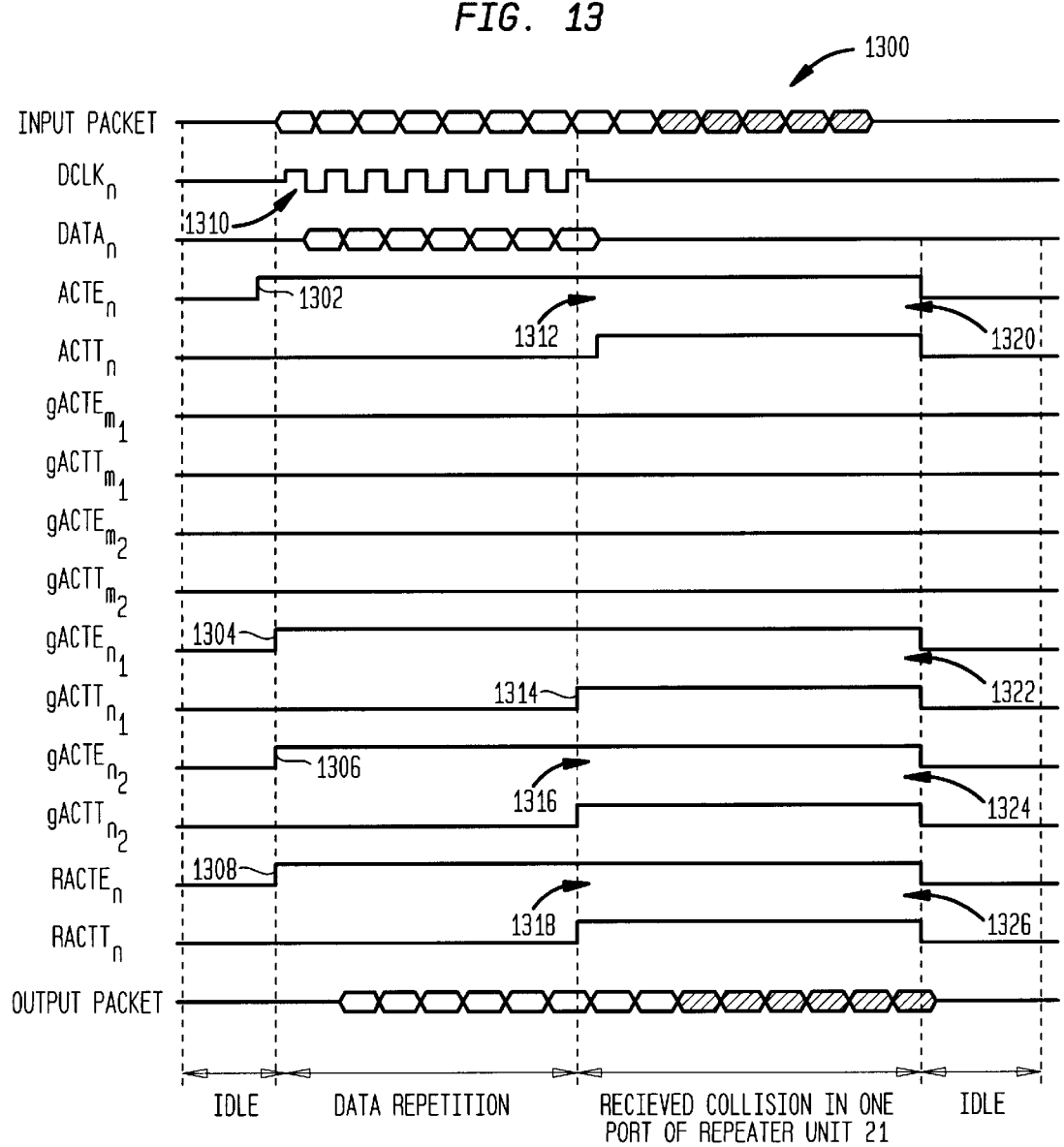

EXPANDABLE ETHERNET NETWORK REPEATER UNIT

RELATED PATENTS AND PATENT APPLICATIONS

The following related patent and patent applications are owned by the assignee of this patent application:

(1) U.S. Pat. No. 5,517,520 entitled "Expandable Repeater" and issued on May 14, 1996 to Bin-Chi Chiou;

(2) U.S. patent application Ser. No. 08/947,179, entitled "Infinitely Expandable Ethernet Network Repeater Unit", filed on Oct. 8, 1997; and (3) U.S. patent application Ser. No. 08/919,010, entitled "Expandable Ethernet Network Repeater Unit", filed on Aug. 27, 1997, now issued as U.S. Pat. No. 5,949,818, on Sep. 7, 1999.

The contents of these patent and patent applications are incorporated herein by reference.

BACKGROUND OF THE INVENTION

1. Field of the Invention

The present invention relates to computer networks and, more particularly, to a repeater in a Local Area Network operating according to IEEE Standard 802.3 (an Ethernet network) that may be expandable to have an unlimited number of ports, yet operate as a single repeater unit as defined by IEEE 802.3.

2. Discussion of Related Art

Local Area Networks (LAN) are computer networks which allow a number of data terminal equipment (DTE) to share resources and communicate with each other, thus greatly expanding the usefulness of each DTE. Many types of LANs are known. One common LAN type is a Carrier Sense, Multiple Access Collision Detection (CSMA/CD) network, defined by the IEEE 802.3 Standard and commonly referred to as an Ethernet network. (Ethernet is a registered trademark of the XEROX corporation.) The contents of the IEEE 802.3 Standard are incorporated herein by reference.

Briefly, an Ethernet network operates in the following manner. As seen in FIG. 1, an Ethernet network 100 may include a number of DTEs 102 each connected to a port 103 of a central hub or repeater 104. The DTEs and hub are arranged in a star topology. When a DTE 102 wishes to transmit data to other DTEs on the network, the DTE waits for a quiet period on the network, and then sends the intended message to the repeater 104 in bit-serial form. The repeater 104 then repeats the message to all of the DTEs connected to it. If, after initiating a transmission, another DTE also attempts to transmit a message at the same time, a "collision" is detected. If a collision is detected, then both transmitting stations send a few additional bytes to ensure propagation of the collision throughout the network. The transmitted messages are discarded. The DTEs that attempted to transmit remain silent for a random time ("back-off") before attempting to transmit again. Because each DTE 102 selects its back-off time independently of the other DTEs, a second collision may be avoided.

As seen in FIG. 2, a number of repeaters 104 may be connected to create a series 200 of connected hubs or repeaters. To meet IEEE 802.3 timing requirements, the maximum number of repeaters 104 in any series (from any DTE to any other DTE) is four. Moreover, the star topology allows only one DTE to be connected to each port. Limited port availability on repeaters 104 limits the number of DTEs 102 which may connect to a repeater. The limited number of repeaters in any Ethernet series limits the number of DTEs 102 which may be included in a single Ethernet network series (called a collision domain). If each repeater, for example, has eight ports, only 32 DTEs may be connected to a single collision domain. (Note that FIG. 2 shows a collision domain having 26 DTEs.)

A typical repeater comprises a single integrated circuit chip. Because an IC chip has limited drive current, each chip has a limited number of ports. Thus, each repeater is limited to a number of ports, thus limiting the total number of DTEs which may be connected to a single collision domain. Thus, it is desirable to have repeater units which may be expanded to have additional ports.

Expandable repeaters are known. For example, an expandable repeater is described in U.S. Pat. No. 5,265,123 issued on Nov. 23, 1993 to Vijeh, et al. The contents of this document are incorporated herein by reference. Vijeh, et al. disclose an expandable repeater which connects each repeater unit to an expansion bus. For a repeater unit to transmit on the expansion bus, it must seek permission to do so. An arbiter receives request signals from repeat units seeking to transmit onto the bus, determines which repeater unit may control the expansion bus, issues an acknowledgement signal to that repeater unit, and precludes other repeater units from simultaneously controlling the bus.

U.S. Pat. No. 5,517,520, described above, discloses an expandable repeater in which a number of repeater units are connected in a star topology to an integrator unit. Each repeater unit has an input/output for providing clock, data, control, and collision information to the integrator. A repeater unit issues a request-for-access signal when it wants to transmit to the integrator unit.

It is an object of the present invention to provide an expandable repeater which does not use request or acknowledge signals.

SUMMARY OF THE INVENTION

This and other objects of the present invention are provided by a repeater comprising two or more repeater units. Each repeater unit transmits signals to and receives signals from a bus. Each repeater unit is also connected to a distributed network status indicator (DNSI). The DNSI responds to status signals from the connected repeater unit and other DNSIs to generate global network status signals. These global network status signals are transmitted to other DNSIs and in turn are transmitted to other repeater units. These global network status signals coordinate the repeater units to function as a single repeater according to the IEEE 802.3 Standard.

An expandable repeater according to a preferred embodiment of the present invention includes several repeater units combined as a single repeater set. Each repeater unit is connected to at least one DTE, to a distributed network status indicator (DNSI), and a data and clock bus to which other repeater units are also connected. Each DNSI responds to repeater unit status signals received from the repeater unit to which it is connected and to repeater group status signals received from other DNSIs. Using these received signals, the DSNI generates global network status signals and repeater group status signals. As a result, the combination of repeater units operate as a single repeater as defined in the IEEE 802.3 Standard.

In operation, a repeater unit generates status signals according to the inputs received from its connected DTEs in a well known manner. These status signals are provided to the DNSI to which the repeater unit is connected. The DNSI also receives repeater group status signals from the repeater groups connected to it. Using these signals, the DNSI generates signals indicating (1) the status of repeater groups in which it is included, and (2) the global status of the network. If the global network status signals indicate that the network is in the ready state, a DTE may transmit data and timing signals to the repeater unit 104' to which it is connected. This transmission places the repeater unit in the receive state. This status change is detected by the DNSI, which changes the network status signals. This alerts all DNSIs and thus each repeater unit, that a transmission is coming. The data and timing signals are placed on the data and clock bus by the appropriate repeater unit and received from the bus by the other repeater units.

If during the transmission from the repeater unit, another DTE (from that repeater unit or another) attempts to send a transmission, a collision is detected and the network status signals are changed accordingly. This alerts all of the repeater units to discard the received data and timing signals and the collision is handled in a conventional manner pursuant to the IEEE 802.3 Standard.

Each distributed network status indicator uses the status signals received from the repeater unit and from the DNSIs to which it is connected to generate global network status signals which are provided to the repeater unit. These global network status signals permit a number of repeater units to share the data and clock bus and thus to operate as a single repeater unit. The expandable repeater permits a number of repeater units to be combined to operate as a single repeater, thus increasing the number of DTEs which may be connected to a single Ethernet collision domain. However, the repeater units do not have to share a common clock source and may indeed have different phase relationships with each other. Also, the repeater operates without repeater units requesting access to transmit and does not need to receive an acknowledgment signal before transmitting data to the network.

BRIEF DESCRIPTION OF THE DRAWINGS

The present invention is described with reference to the following figures:

FIGS. 8–13 are timing diagrams illustrating the operation of a preferred embodiment according to the present invention.

DETAILED DESCRIPTION OF PREFERRED EMBODIMENTS

The invention is described in the following sections:

I. An overview of the structure and function of a preferred embodiment of an expandable repeater according to the present invention is provided with reference to FIGS. 3 and 4.

II. A repeater unit and repeater unit input/output (I/O) are described with reference to FIG. 5.

III. A distributed network status indicator (DNSI) is described with reference to FIGS. 6–7D.

IV. Timing diagrams illustrating operation of a preferred embodiment of the present invention are described with reference to FIGS. 8–13.

V. A conclusion is provided.

I. Overview of the Invention

A. Structural Overview

Figure 1:
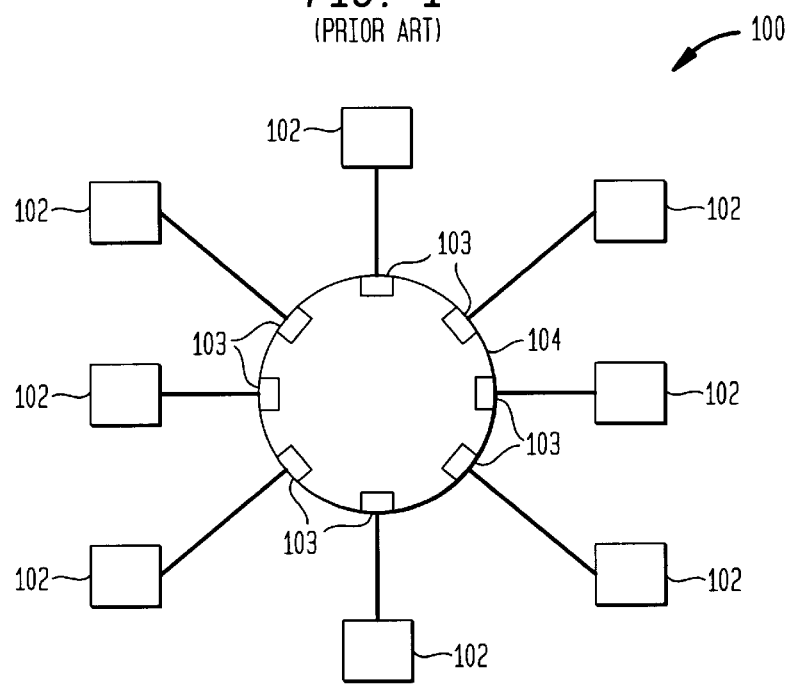
FIG. 1 is a block diagram of a typical Ethernet network consisting of a single repeater.
Figure 2:
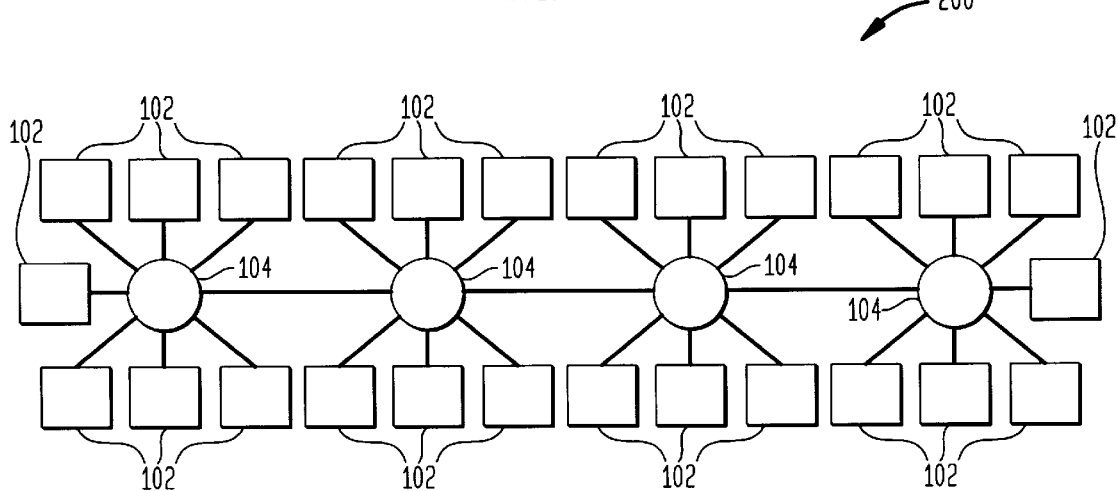
FIG. 2 is a block diagram of an Ethernet network collision domain consisting of a series of four repeaters.
Figure 3A:
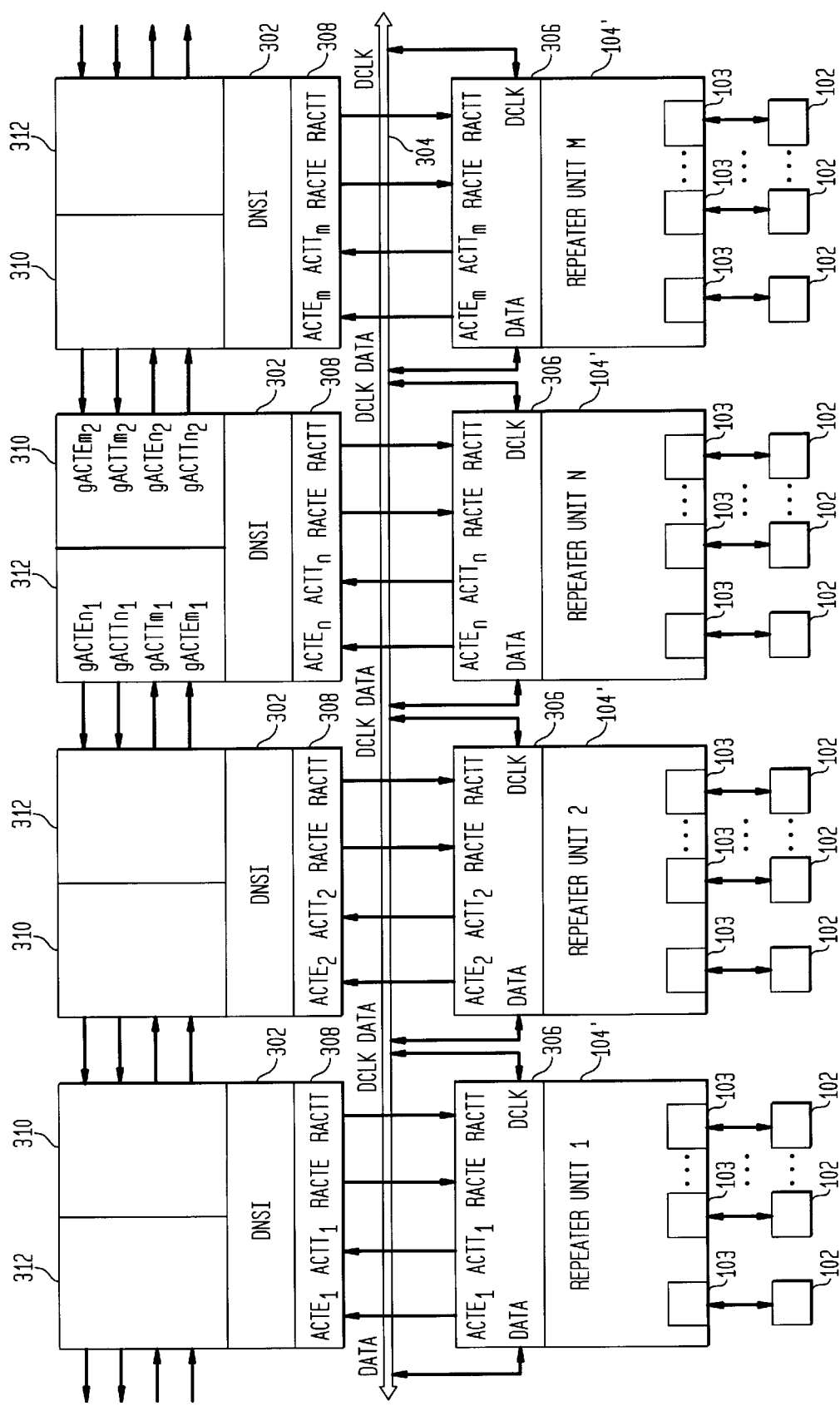
FIG. 3A is a block diagram of an expandable repeater according to a preferred embodiment of the present invention.

In accordance with the present invention, FIG. 3A is a block diagram of a preferred embodiment of an expandable repeater 300 including several repeater units 104' combined as a single repeater set. Each repeater unit 104' is connected to a number of DTEs 102. Each repeater unit 104' is also connected to a distributed network status indicator (DNSI) 302 and to a data and clock bus 304. Each DNSI 302 responds to repeater unit status signals received from the repeater unit 104' to which it is connected and to repeater group status signals received from other DNSIs 302. The data and clock bus 304 is connected to each repeater unit 104'. The repeater units may selectively transmit to and receive from the bus the data and timing signals according to network status signals received from the DNSIs 302. As described below, the combination of repeater units operate as a single repeater as defined in the IEEE 802.3 Standard.

Each repeater unit 104' has a repeater unit I/O 306 which (1) transmits repeater unit status signals to and receives global network status signals from the DNSI 302 to which it is connected and (2) transmits and receives data and timing signals from the data and clock bus 304, to which the other repeater units 104' are connected. The DNSI 302 has a first I/O 308 which receives repeater unit status signals and sends global network status signals to the repeater unit 104' to which it is connected. The DNSI 302 has a second I/O 310 which transmits repeater group status signals to and receives repeater group status signals from a second DNSI. The DNSI has a third I/O 312 which transmits repeater group status signals to and receives repeater group status signals from a third DNSI. The DNSI 302 uses the status signals received from the repeater unit 104' to which it is connected and the DNSIs connected to its second and third I/Os 310, 312 to generate global status signals which it provides to the repeater unit 104' to which it is connected.

Figure 4:
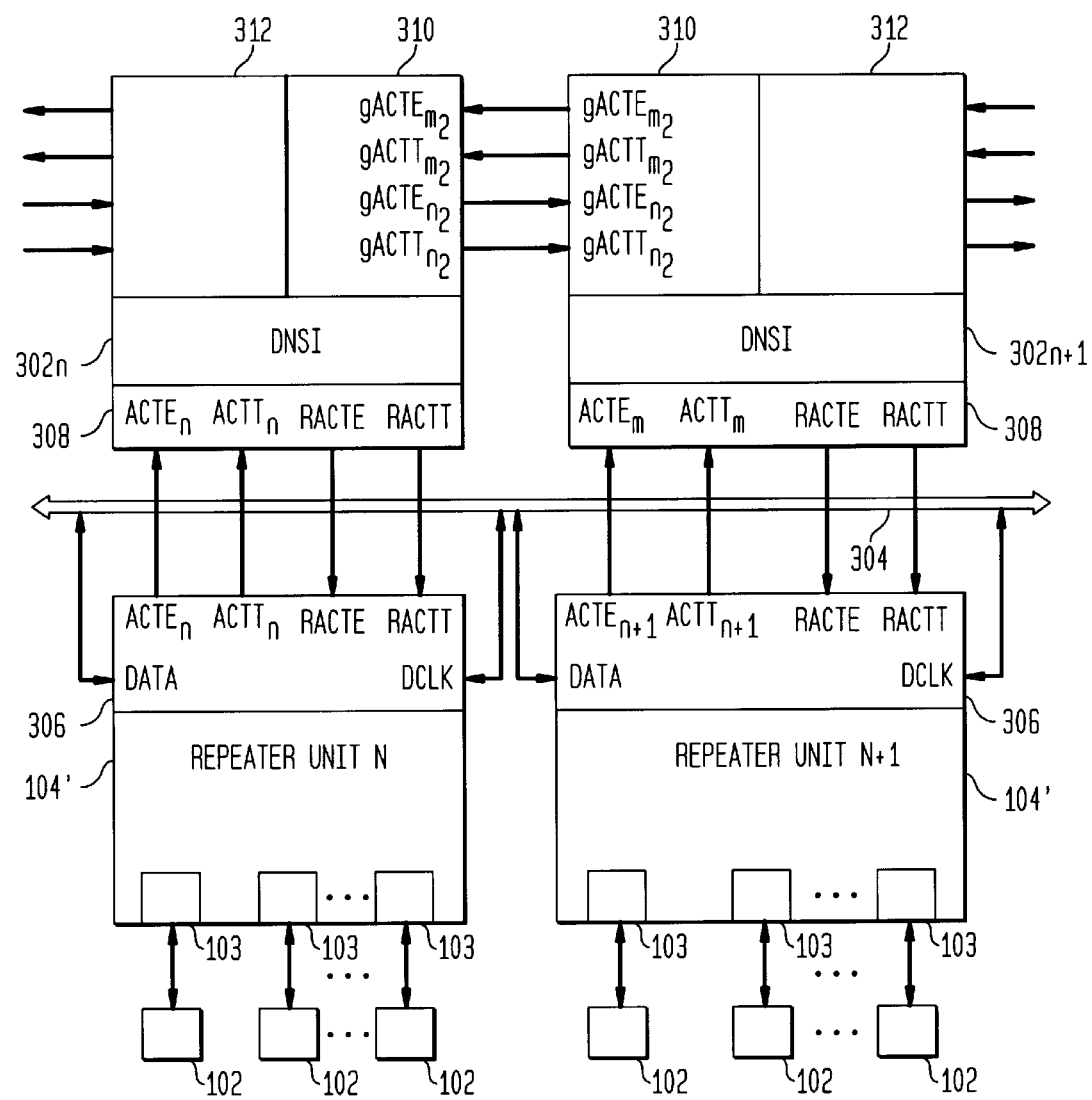
FIG. 4 is a block diagram of a repeater group according to a preferred embodiment of the present invention.

FIG. 4 illustrates a repeater group 400. A repeater group 400 comprises one or more repeater units 104' (here, two repeater units N and N+1 are shown) and their connected distributed network status indicators 302n, 302n+1. The combined status signals of the group are used to generate group status signals. Each repeater unit 104' and connected DNSI 302 is included in two groups: a first group comprising the repeater units/DNSIs connected to the DSNI by the second I/O 310; and a second group comprising the repeater units/DNSIs connected to the DSNI by the third I/O 312.

Figure 3B:
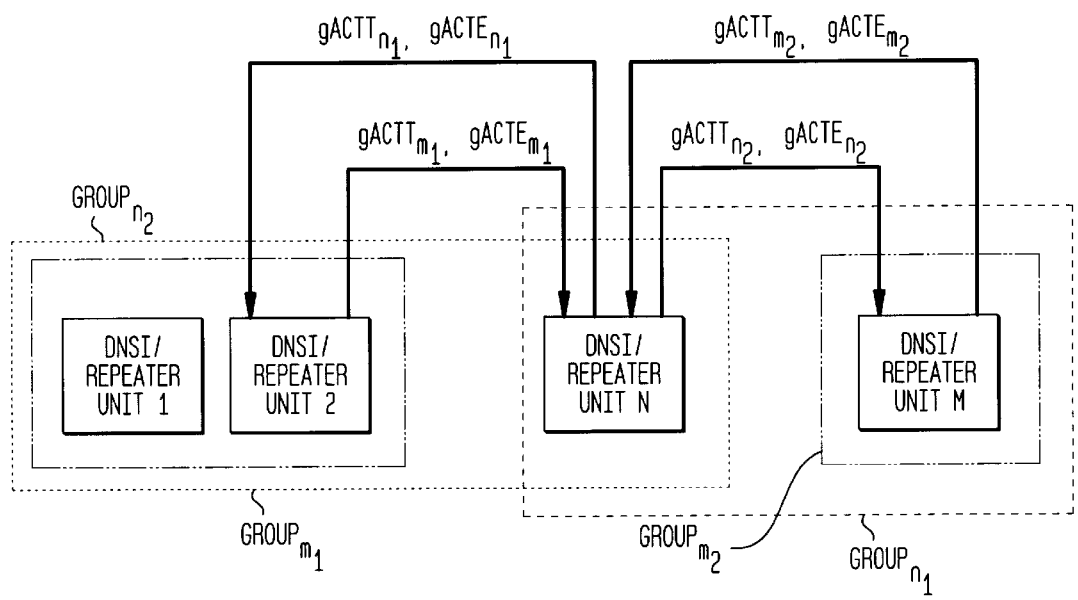
FIG. 3B is a simplified block design of FIG. 3A illustrating repeater groups.

FIG. 3B is a simplified block diagram illustrating a preferred arrangement of repeater groups. Each repeater unit/DNSI combination is indicated by a single block (i.e., blocks 1, 2, N, M). A number of repeater groups are shown.

A first group, group n1, includes repeater unit/DNSI M (here, assume M=4) and repeater unit/DNSI N (here, assume N=3). Group n1 is outlined with a dashed line. A second group, group n2, includes repeater unit/DNSI 1, repeater unit/DNSI 2, and repeater unit/DNSI N. Group n2 is outlined with a dotted line. A third group, group m1, includes repeater unit/DNSI 1 and repeater unit/DNSI 2. Group m1 is outlined with a dotted and dashed line. A fourth group, group m2, includes only repeater unit/DNSI M. Group m2 is outlined with a double dotted, single dashed line.

FIG. 3B also illustrates the signals received by and transmitted from DNSI N's second and third I/Os 310, 312. In this illustrative embodiment, repeater unit/DNSI N is part of two repeater unit groups, n1 and n2. To the left (in this illustration) of repeater unit/DNSI N is repeater unit group m1; to the right is repeater unit group m2. Repeater unit/DNSI N receives gACTTm1 and gACTEm1 signals repeater group m1. Repeater unit N generates gACTTn1 and gACTEn1 signals which repeater unit/DNSI N transmits to group m1. Likewise, repeater unit/DNSI N receives gACTTm2 and gACTEm2 signals repeater group m2. Repeater unit N generates gACTTn2 and gACTEn2 signals which repeater unit/DNSI N transmits to group m2.

The distributed network status indicators use the status signals received from the repeater unit 104' and the DNSIs to which it is connected to generate global network status signals which are provided to the repeater unit. These global network status signals permit a number of repeater units 104' to share a data and clock bus 304 and thus to operate as a single repeater unit. However, the repeater units do not have to share a common clock source and may indeed have different phase relationships with each other.

B. Functional Overview

To understand the operation of the expandable repeater according to the present invention, a brief description of its operation is provided.

A repeater unit 104' generates status signals (ACTEn, ACTTn) (where n indicates that the signal represents a particular repeater unit 104'; n=1, 2, 3, . . . , N , . . . , M) according to the inputs received from its connected DTEs 102 in a well known manner described in the ETHERNET standard. These status signals are provided to the DNSI 302 to which the repeater unit 104' is connected. The DNSI also receives repeater group status signals from the repeater groups connected to its I/Os 310 (gACTTm1, gACTEm1), 312 (gACTTm2, gACTEm2). Using these three sets of signals, the DNSI generates:

(1) first group status signals (gACTTn1, gACTEn1) reflecting the status of the group including itself and the one or more repeater unit(s)/DNSI(s) in the repeater group connected to its second I/O 312, and transmits these status signals from its third I/O 310;

(2) second group status signals (gACTTn2, gACTEn2) reflecting the status of the group including itself and the one or more repeater unit(s)/DNSI(s) in the repeater group connected to its third I/O 310, and transmits these status signals from its second I/O 312; and (3) global network status signals (RACTTn, RACTEn) reflecting the status of the entire network. These global status signals instruct the repeater unit 104' to transmit or receive signals from the data and clock bus 304 or that a collision has occurred. DSNI transits these signals from the first I/O 308 to the repeater unit interface 306.

If the global network status signals indicate that the network is in the ready state, a DTE 102 may transmit information to the repeater unit 104' to which it is connected. This transmission places the repeater units in the receive state. This status change is detected by the DNSI 302, which changes the network status signals. This alerts all DNSIs 302, and thus each repeater unit 104', that a transmission is coming. The data and timing signals are placed on the data and clock bus 304 by the appropriate repeater unit 104 and received from the bus by the other repeater units.

If during the transmission from the repeater unit, another DTE 102 (from that repeater unit or another) attempts to send a transmission, a collision is detected and the network status signals are changed accordingly. This alerts all of the repeater units to discard the received data and the collision is handled in a conventional manner pursuant to the IEEE 802.3 Standard.

II. The Repeater Units & Repeater Units I/O

Each of the M repeater units 104' is preferably a monolithic integrated circuit which primarily performs state machine functions required by the IEEE 802.3 Standard. These functions are well known and are not further described.

The repeater unit I/O 306 connects a repeater unit 104' to the distributed network status indicator 302 (via the DNSIs first I/O 308) and the data and clock bus 304. The repeater unit I/O 306 exchanges information between the repeater unit 104', and distributed network status indicator 302, and the data and clock bus 304.

Figure 5:
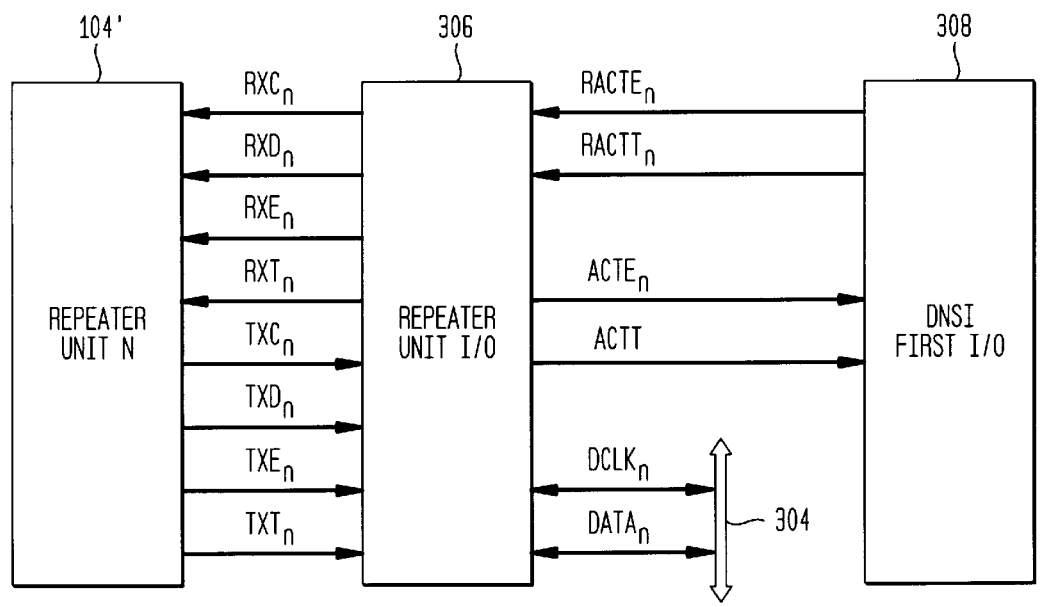
FIG. 5 is a block diagram of network repeater interfaces between (1) the repeater unit and a DTE and (2) the repeater unit and a distributed network status indicator (DNSI)

FIG. 5 is a block diagram of a repeater unit I/O 306 and shows the signals exchanged (1) between the repeater unit I/O 306 and the repeater unit 104', and (2) between the repeater unit I/O 306 and the distributed network status indicator first I/O 308, and the data and clock bus 304.

The repeater unit I/O 306 receives the following signals from the repeater unit 104':

TXCn: transmit data clock of repeater unit n
TXDn: transmit data of repeater unit n
TXEn: transmit enable of repeater unit n
TXTn: transmit type of repeater unit n These signals are data (TXD) and timing information (TXC) received from a DTE 102 connected to the repeater unit to be repeated to other repeater units; and repeater unit status information (TXE, TXT).

The repeater unit I/O 306 sends to the repeater unit 104' the following signals:

RXCn: receive data clock from the data and clock bus 304
RXDn: receive data from the data and clock bus 304
RXEn: received enable status from the DNSI 302
RXTn: received type status from the DNSI 302

These are data (RXD) and timing signals (RXC) received from the data and clock bus 304 to be repeated to the DTEs 102 connected to the repeater unit, and the network status signals (RXEn, RXTn) received from the DSNI.

The repeater unit I/O 306 sends the following signals to the DNSI first I/O 308:

ACTEn: activity enable for repeater unit N
ACTTn: activity type for repeater unit N These are activity status indication signals for the Nth data repeater unit 104'. ACTEn is a repeater "activity enable" signal and ACTTn is a repeater "activity type" signal. These two signals provide four types of activity status of the Nth data repeater unit. The four types of status activity are: (1) ready to receive data (READY), (2) receiving data (RXING), (3) detecting a receive collision (RXCOL), and (4) detecting a transmit collision (TXCOL).

When the Nth data repeater unit is in the READY state, the repeater unit 104' is ready to receive and repeat data and timing signals from its DTE port 103 or I/O port 306, and no collision has occurred. When the Nth data repeater unit 104' is in the RXING state, the repeater unit 104' receiving and repeating data and timing signals from one of its DTE ports 103 (not its I/O port 306) and will transmit the received signals to the other DTEs connected to the repeater unit 104'. The received data and timing signals will also be transmitted by the repeater unit I/O 306, where it will be received by the data and clock bus 304 and ultimately transmitted to the other repeater units 104' connected to the bus.

The Nth data repeater unit 104' is in the RXCOL state if the repeater unit 104 is receiving a collided packet data from one of its DTE ports 103. The data received during a received collision is discarded.

The Nth data repeater unit is in the TXCOL state when the repeater unit 104' receives a packet from one of the DTEs 102 connected to it or from I/O 302, and while transmitting the received data to other DTEs, detects data coming from one or more other network ports 103 other than the port on which it is already receiving data.

The table below shows the relationship between ACTEn and ACTTn and the four states.

|       | READYn | RXINGn | TXCOLn | RXCOLn |
|-------|--------|--------|--------|--------|
| ACTTn | 0      | 0      | 1      | 1      |
| ACTEn | 0      | 1      | 0      | 1      |

Note:
0 indicates that the signal is deasserted.
1 indicates that the signal is asserted.

If the repeater device is an active low device, a low voltage is an assertion of the signal and a high voltage is a deassertion of the signal.

Bidirectional lines which are selectively input or output between the repeater unit I/O 306 and the data and clock bus 304 are:

DCLKn: data clock
DATAn: data

The DCLKn and DATAn lines are bidirectional. When the Nth repeater unit is in the READY state (described below), it may receive data and timing signals on the DATAn and DCLKn bus lines from data and clock bus 304 to repeat to the DTEs 102 connected to it. When the Nth repeater unit 104' is transmitting data received from a DTE 102 connected to it, the repeater unit 104' outputs data and timing signals on the DCLKn and DATAn bus lines.

DATAn is a data signal synchronized with DCLKn. The clock on DCLKn is used to latch the data on DATAn when the Nth data repeater unit 104' is repeating data received from the data and clock bus 304 and is used to repeat the DATAn onto the data and clock bus. The latched data may be buffered into an internal FIFO memory of the Nth data repeater unit 104' for transmitting to the DTEs 102 connected to it. The DCLKn received by a repeater unit 104' need not be synchronized with the repeater unit receiving the data, but should be synchronized with the operation clock of the repeater unit 104' which is transmitting the data to the data and clock bus. Thus, DATAn may be transmitted asynchronously to the repeater units 104'. Note that the frequency of the clock DCLKn is the data rate of the data on DATAn. Because the data signals are clocked with the timing signals, the repeater units do not have to share a common clock source and may indeed have different phase relationships with each other.

The repeater unit I/O 306 receives the following signals from the DNSI first I/O 308:

RACTEn: activity enable status received from the DNSI;

RACTTn: activity type status received from the DNSI.

RACTEn and RACTTn are repeater activity status indication signals for the entire repeater set received from the DNSI.

III. The Distributed Network Status Indicator

Figure 6:
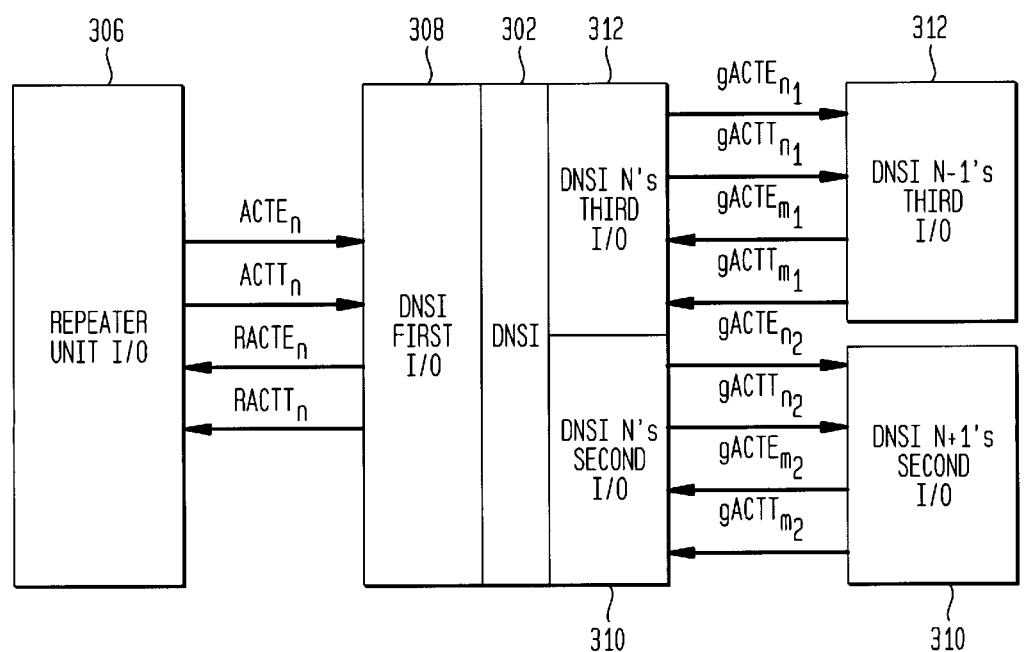
FIG. 6 is a block diagram of DNSI interfaces between (1) the DNSI and a repeater unit and (2) the DNSI and other DNSIs.

FIG. 6 is a block diagram of a distributed network status indicator and shows the signals exchanged between (1) the DNSI first I/O 308 and the repeater unit I/O 306; (2) the second DNSI I/O 310 and the second DNSI I/O 310 for DNSI N+1 (i.e., the next higher DNSI); and (3) the DNSI third I/O 312 and the third I/O 312 for DNSI N−1 (i.e., the next lower DNSI). As described above, the DNSI first I/O receives repeater unit status signals ACTEn and ACTTn from the repeater unit I/O 306 and transmits global network status signals RACTEn and RACTTn to the repeater unit I/O 306.

The DNSI transmits the following signals from the DNSI second I/O 310:

gACTEn2: global activity enable status of repeater group n2 (e.g., the repeater group comprising of repeater unit/DNSI N and repeater unit/DNSI N−1);

gACTTn2: global activity type status of repeater group n1.

The DNSI receives the following signals on the DNSI second I/O 310:

gACTEm2: global activity enable status received from repeater group m2 (e.g., the repeater group comprising of repeater unit/DNSI N+1).

gACTTm2: global activity type status received from repeater group m2.

The DNSI transmits the following signals from the DNSI third I/O 312:

gACTEn1: global activity enable status of repeater group n1 (e.g., the repeater group comprising of repeater unit/DNSI N and repeater unit/DNSI N+1);

gACTTn1: global activity type status of repeater group n1

The DNSI receives the following signals on the DNSI third I/O 312:

gACTEm1: global activity enable status received from repeater group m1 (e.g., the repeater group comprising of repeater unit/DNSI N−1 and repeater unit/DNSI N−2);

gACTTm1: global activity type status received from repeater group m1.

Figure 7A:
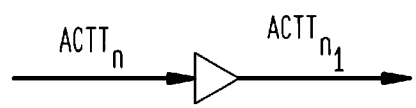
FIGS. 7A–D are schematic diagrams of the possible circuit implementations of logical functions performed by the present invention.

Note that ACTTn1 and ACTEn1 have the same meaning as ACTTn and ACTEn. This is because the DNSI relays these values without modification. FIG. 7A illustrates the relay 700 of ACTTn/ACTEn and ACTTn1/ACTEn1.

The input/output relationship between the inputs ACTTn, ACTEn, gACTTm2, gACTEm2 and the outputs gACTTn1 and ACTEn1 are provided in the following table:

| INPUT | | | | OUTPUT | |
|---|---|---|---|---|---|
| ACTTn | ACTEn | gACTTm2 | gACTEm2 | gACTTn1 | gACTEn1 |
| 0 | 0 | 0 | 0 | 0 | 0 |
| 0 | 1 | 0 | 0 | 0 | 1 |
| 0 | 0 | 0 | 1 | 0 | 1 |
| 1 | 1 | 1 | 1 | 1 | 0 |
| X | X | 1 | 0 | 1 | 0 |
| 1 | 0 | X | X | 1 | 0 |
| 1 | 1 | 0 | 0 | 1 | 1 |
| 0 | 0 | 1 | 1 | 1 | 1 |

The relationships shown in this table may be expressed using the following equations:

/gACTTn1 = /ACTTn*/ACTEn*/gACTTm2*/gACTEm2 +
           /ACTTn* ACTEn*/gACTTm2*/gACTEm2 +
           /ACTTn*/ACTEn*/gACTTm2* gACTEm2
/gACTEn1 = /ACTTn*/ACTEn*/gACTTm2*/gACTEm2 +
           ACTTn* ACTEn* gACTTm2* gACTEm2 +
           ACTTn*/ACTEn + gACTTm2*/gACTEm2

Figure 7B:
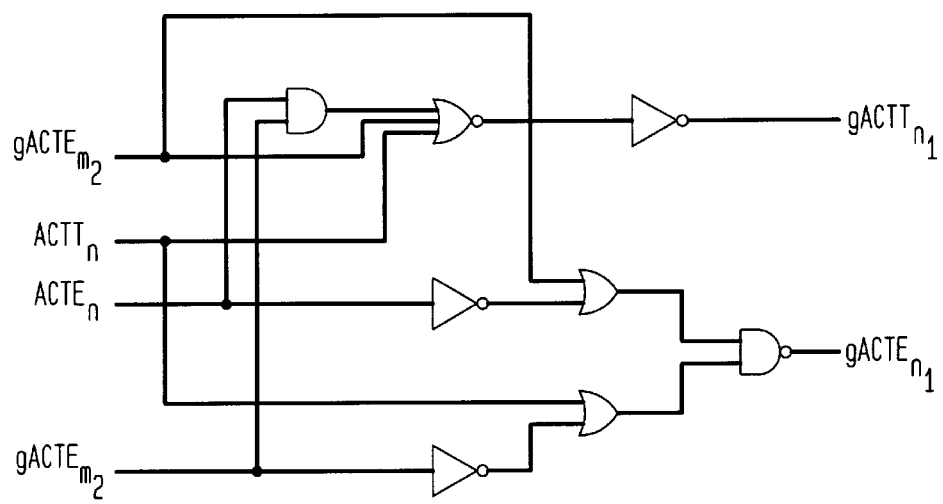

(Note that "/" indicates inverted logic.) FIG. 7B is a schematic illustration of one possible circuit implementation 710 of the truth table set out above.

The input/output relationship between inputs ACTTn, ACTEn, gACTTm1, gACTEm1, and outputs gACTTn2, and gACTEn2 are provided in the following table:

| INPUT | | | | OUTPUT | |
|---|---|---|---|---|---|
| ACTTn | ACTEn | gACTTm1 | gACTEm1 | gACTTn2 | gACTEn2 |
| 0 | 0 | 0 | 0 | 0 | 0 |
| 0 | 1 | 0 | 0 | 0 | 1 |
| 0 | 0 | 0 | 1 | 0 | 1 |
| 1 | 1 | 1 | 1 | 1 | 0 |
| X | X | 1 | 0 | 1 | 0 |
| 1 | 0 | X | X | 1 | 0 |
| 1 | 1 | 0 | 0 | 1 | 1 |
| 0 | 0 | 1 | 1 | 1 | 1 |

The relationships shown in this table may be expressed using the following equations:

/gACTTn2 = /ACTTn*/ACTEn*/gACTTm1*/gACTEm1 +
           /ACTTn* ACTEn*/gACTTm1*/gACTEm1 +
           /ACTTn*/ACTEn*/gACTTm1* gACTEm1
/gACTEn1 = /ACTTn*/ACTEn*/gACTTm1*/gACTEm1 +
           ACTTn* ACTEn* gACTTm1* gACTEm1 +
           ACTTn*/ACTEn + gACTTm1*/gACTEm1

Figure 7C:
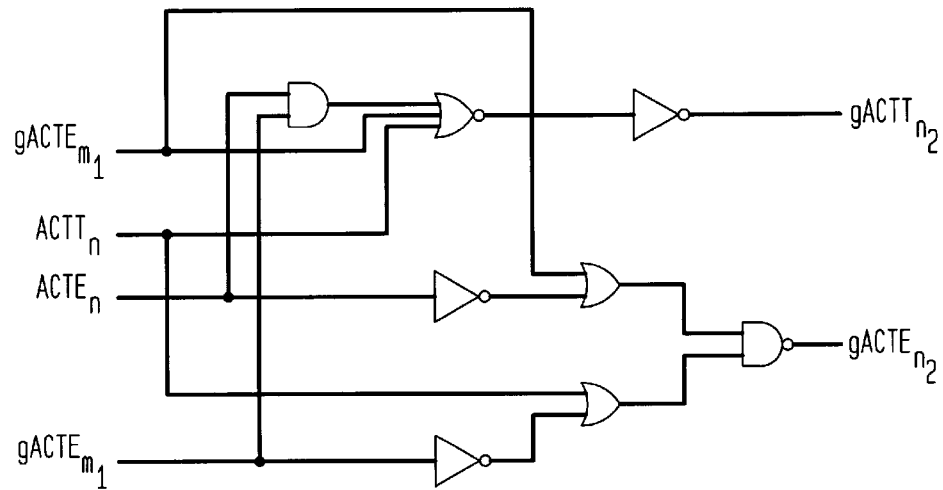

(Note that "/" indicates inverted logic.) FIG. 7C is a schematic illustration of one possible circuit implementation 720 of the truth table set out above.

The input/output relationship between inputs ACTTn, ACTEn, gACTTm1, gACTEm1, gACTTm2, and gACTEm2 and outputs RACTTn and RACTEn are provided in the following table:

| INPUT | | | | | | OUT PUT | |
|---|---|---|---|---|---|---|---|
| ACTTn | ACTEn | gACTTm1 | gACTEm1 | gACTTm2 | gACTEm2 | RACTTn | RACTEn |
| 0 | 0 | 0 | 0 | 0 | 0 | 0 | 0 |
| 0 | 1 | 0 | 0 | 0 | 0 | 0 | 1 |
| 0 | 0 | 0 | 1 | 0 | 0 | 0 | 1 |
| 0 | 0 | 0 | 0 | 0 | 1 | 0 | 1 |
| 1 | 1 | 1 | 1 | X | X | 1 | 0 |
| 1 | 1 | X | X | 1 | 1 | 1 | 0 |
| X | X | 1 | 1 | 1 | 1 | 1 | 0 |
| 1 | 0 | X | X | X | X | 1 | 0 |
| X | X | 1 | 0 | X | X | 1 | 0 |
| X | X | X | X | 1 | 0 | 1 | 0 |
| 1 | 1 | 0 | 0 | 0 | 0 | 1 | 1 |
| 0 | 0 | 1 | 1 | 0 | 0 | 1 | 1 |
| 0 | 0 | 0 | 0 | 1 | 1 | 1 | 1 |

The relationships shown in this table may be expressed using the following equations:

/RACTTn = /ACTTn*/ACTEn*/gACTTm1*/gACTEm1*/gACTTm2*/gACTEm2 +
          /ACTTn* ACTEn*/gACTTm1*/gACTEm1*/gACTTm2*/gACTEm2 +
          /ACTTn*/ACTEn*/gACTTm1* gACTEm1*/gACTTm2*/gACTEm2 +
          /ACTTn*/ACTEn*/gACTTm1*/gACTEm1*/gACTTm2* gACTEm2
/RACTEn = /ACTTn*/ACTEn*/gACTTm1*/gACTEm1*/gACTTm2*/gACTEm2 +
          ACTTn* ACTEn* gACTTm1* gACTEm1 +
          ACTTn*/ACTEn + gACTTm1*/gACTEm1 + gACTTm2*/gACTEm2 +
          ACTTn* ACTEn* gACTTm2* gACTEm2 +
          gACTTm1* gACTEm1* gACTTm2* gACTEm2

Figure 7D:
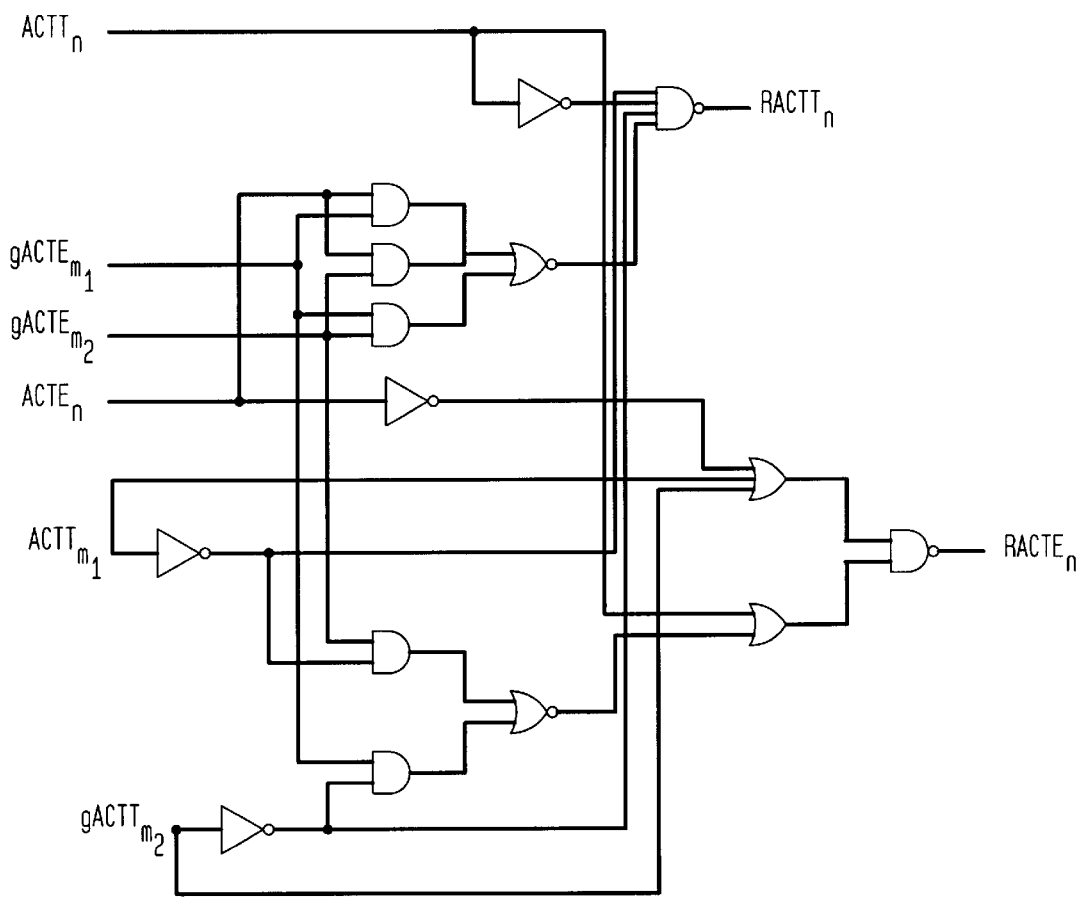

(Note "/" indicates inverted logic.) FIG. 7D is a schematic illustration of one possible circuit implementation 730 of the truth table set out above.

IV. Timing Diagrams

The operation of a repeater set according to a preferred embodiment of the present invention is described with reference to a number of timing diagrams.

FIG. 8 is a timing diagram 800 illustrating the operation of a preferred embodiment of the present invention when a repeater unit N receives data and timing signals from a DTE 102 connected to it and transmits the data and timing signals to the data and clock bus 304. In FIG. 8, repeater unit N begins in the READY state. (Note that ACTEn and ACTTn are deasserted.) A DTE 102 connected to repeater unit N transmits data and timing signals to the repeater unit 104' and repeater unit N enters the RXING state 802. (Note that ACTEn is asserted.) After a brief propagation delay, the status for the groups including repeater unit N (i.e., groups n1 and n2) transition from READY to RXING 804, 806 (gACTEn1 and gACTEn2 are asserted). The global network status also transitions to the RXING state 808 (i.e., RACTEn is asserted). Repeater unit N transmits the data and timing signals 810 from the DTE 102 to the data and clock bus 304. Each repeater unit 104' accesses the data and timing signals from the data and clock bus 812 and transmits these signals to the DTEs connected to those repeater units. After the signals have been repeated, repeater N returns to the READY state 814. After a brief propagation delay, the status signals for the groups including repeater unit N (i.e., groups n1 and n2) and the global network status transition from the RXING state to the READY state 816, 818, 820. Note that groups not including repeater unit N do not receive signals on their DTE ports 103 and thus remain in the READY state (i.e., gACTEm1, gACTTm1, gACTEm2, and gACTTm2 are deasserted) throughout the data repetition process.

FIG. 9 is a timing diagram 900 illustrating the operation of the present invention when repeater units M (where repeater unit M is in group m2) attempts to transmit while repeater unit N is transmitting. This is a transmit collision. In FIG. 9, repeater unit N begins in the READY state. (Note that ACTEn and ACTTn are deasserted.) A DTE 102 connected to repeater unit N transmits signals to the repeater unit 104' and repeater unit N enters the RXING state 902. (Note that ACTEn is asserted.) After a brief propagation delay, the status for the groups including repeater unit N (i.e., groups n1 and n2) transition from READY to RXING 904, 906 (gACTEn1 and gACTEn2 are asserted). The global network status also transitions to the RXING state 908 (i.e., RACTEn is asserted). Repeater unit N transmits data and timing signals 910 from the DTE 102 to the data and clock bus 304.

During the data repetition of the signals received from repeater unit N, repeater unit M in group m2 receives data from a DTE 102 connected to it. Group m2 transitions to the RXING state 912. (ACTEm2 is asserted.) Because two different repeater units are receiving signals at the same time, a transmit collision occurs. The RXING state of group m2 is used to determine the state of group n1 and the global status, but groups n2 and m1 are not affected by group m2. Thus, after a brief propagation delay after ACTEm2 is asserted, (1) gACTEn1 is deasserted and gACTTn1 is asserted 914; and (2) RACTEn is deasserted and RACTTn is asserted 916, indicating a transmit collision between two repeater units. When repeater unit N's incoming data ends, it transitions from the RXING state to the READY state 918. (ACTEn is deasserted.) Group n2 also transitions from the RXING state to the READY state 920 (gACTEn2 is deasserted.) After a brief propagation delay, the transmit collision state ends and group n1 and the global status return to the RXING state, 922, 924 (i.e., gACTEn1 is asserted and gACTTn1 is deasserted; RACTEn is asserted and RACTTn is deasserted) because repeater unit M remains in the RXING state. When repeater unit M finishes transmitting, group m2 transitions from the RXING state to the READY state 926, and group n1 and the global network status return to the READY state as well 928, 930.

FIG. 10 is a timing diagram 1000 illustrating the operation of the present invention when a transmit collision occurs wherein two ports on repeater unit N. Repeater unit N begins in the READY state. A DTE 102 connected to repeater unit N transmits data and timing signals to repeater unit N. Repeater unit N enters the RXING state 1002. (ACTEn is asserted.) Groups n1 and n2 and the global network status transition from the READY state to the RXING state 1004, 1006, 1008. Repeater unit N receives data and timing signals from a DTE 102 connected to it. During reception of these signals, another DTE connected to repeater unit N attempts to transmit. At this time, ACTEn is deasserted and ACTTn is asserted 1010, indicating a transmit collision (TXCOL). The groups n1 and n2 and the global network status indicate a transmit collision 1012, 1014, 1016 (e.g., gACTEn1 is deasserted and gACTTn1 is asserted; gACTEn2 is deasserted, and gACTTn2 is asserted; and RACTEn is deasserted and RACTTn is asserted). Note that groups not including repeater N (i.e., groups m1 and m2) are not affected by the collision. When repeater unit N returns to the READY state 1018, after a brief propagation delay, the groups n1 and n2 and the global status transition from the TXCOL state to the READY state 1020, 1022, 1024.

FIG. 11 is a timing diagram 1100 illustrating the operation of the present invention when a transmit collision occurs wherein two ports on repeater unit N and two ports on repeater unit M attempt to transmit at the same time. Repeater units N and M (where repeater unit M is in group m2) begin in the READY state. A DTE 102 connected to repeater unit N transmits data and timing signals to repeater unit N. Repeater unit N enters the RXING state 1102. (ACTEn is asserted.) Groups n1 and n2 transition from the READY state to the RXING state 1104, 1106. The global network status also enters the RXING state 1108. Repeater unit N receives data and timing signals 1109 from a DTE 102 connected to it. During reception of these signals, another DTE connected to repeater unit N attempts to transmit. At this time, ACTEn is deasserted and ACTTn is asserted 1110, indicating a transmit collision (TXCOL). Groups n1, n2, and the global network status indicate a transmit collision 1112, 1114, 1116 (e.g., gACTEn1 is deasserted and gACTTn1 is asserted; gACTEn2 is deasserted and gACTTn2 is asserted; and RACTEn is deasserted and RACTTn is asserted).

During the transmit collision signal, a DTE 102 connected to repeater unit M in group m2 attempts to transmit to repeater unit M. As a result, gACTTm is asserted 1118 indicating the group m2 is in the TXCOL state. Because the global network status already indicates a transmit collision, its status signals do not change. When the repeater unit N returns to the READY state 1120, the status of group n2 also returns to the READY state 1122 (recall that group n2 is not affected by the state of group m2). However, group m2 is still in the TXCOL state and therefore group n1, which is affected by the state of group m2, and the global network status remain in the transmit collision state. When group m2 returns to the READY state 1124, after a brief propagation delay, group n1 and the global network status signals return to the READY state 1126, 1128.

FIG. 12 is a timing diagram 1200 illustrating the operation of the present invention when two repeater units experience a receive collision state at the same time. Repeater units N and M (where repeater unit M is in group m1) begin in the READY state. Repeater unit N detects a receive collision 1202 (ACTEn and ACTTn are asserted). Groups n1, n2, and the global network status signals assert gACTEn1 and gACTTn1 1204, gACTEn2 and gACTTn2 1206, and RACTE and RACTT 1208, indicating a receive collision state (RXCOL). During this receive collision state, repeater group m1 also detects a receive collision and asserts gACTEm1 and gACTTm2 1210. Because two receive collision states are detected, group n2 and the global network status signals transition from RXCOL to TXCOL 1212, 1214 (e.g., ACTEn2 and RACTEn are deasserted). When repeater group m1 ceases detecting a receive collision 1216, only a single receive collision state exists. Thus, group n2 and the global network status signals return to the RXCOL state 1218, 1220 (e.g., gACTEn1 and RACTEn are asserted). When repeater unit N's receive collision state ceases 1222, groups n1, n2, and the global network status signals transition to the READY state 1224, 1226, 1228.

FIG. 13 is a timing diagram 1300 illustrating the operation of the present invention when a receive collision occurs within a single repeater unit N. Repeater unit N begins in the READY state. A DTE 102 connected to repeater unit N begins to transmit and repeater unit N enters the RXING state 1302. (ACTEn is asserted.) Groups n1, n2, and the global network status transition from the READY state to the RXING state 1304, 1306, 1308. Data and timing signals 1310 to the data and clock bus 304 from where the data and timing signals may be accessed by other repeater units are transmitted from the DTE to repeater unit N. Repeater unit N transmits the data and timing signals. During the transmission of these signals, repeater unit N detects a collided packet data on the receiving port 103 and ACTTn is asserted 1312 and repeater unit N enters the RXCOL state. Groups n1, n2, and the global network status indicate an RXCOL state 1314, 1316, 1318. When repeater unit N leaves the RXCOL state 1320, groups n1, n2, and the network global status transition from RXCOL state to the READY state 1322, 1324, 1326.

V. Conclusion

An expandable repeater is disclosed which comprises of a number of repeater units, each connected to a distributed network status indicator. The distributed network status indicator receives status signals from the connected repeater unit and adjacent repeater unit groups to determine a network status. Based on this network status, a repeater unit may transmit data and timing signals to a bus, receive data and timing signals from the bus, or be advised that the network is experiencing a collision. This is done without request or acknowledge signals, or using a common clock to synchronize the repeater units.

The above described embodiments of the invention are intended to be illustrative only. Numerous alternative embodiments may be devised by those skilled in the art without departing from the spirit and scope of the following claims.

I claim:

1. An expandable repeater, comprising:
   a. a data and clock bus configured to receive data and timing signals from a plurality of repeater units;
   b. the plurality of repeater units, each repeater unit being:
      (1) configured to communicate with at least one data terminal;
      (2) connected to the data and clock bus and configured to selectively transmit to and receive from the data and clock bus data and timing signals;
      (3) connected to a distributed network status indicator (DNSI) and configured to transmit repeater unit status signals to the DNSI and to receive network status signals from the DNSI; and
   c. a plurality of DNSI, each DNSI responsive to repeater unit status signals and first and second repeater group status signals to generate network status signals and third and fourth repeater group status signals corresponding to the first and second repeater group status signals;

wherein the plurality of DNSI coordinate the plurality of repeater units to operate as a single repeater.

2. The expandable repeater of claim 1, wherein the data is clocked with the timing signals.

3. The expandable repeater of claim 2, wherein the data is transmitted asynchronously to the plurality of repeater units.

4. The expandable repeater of claim 1, wherein the plurality of repeater units comprises monolithic integrated circuit repeater units.

5. The expandable repeater of claim 1, wherein the plurality of repeater units perform IEEE 802.3 Standard machine state functions.

6. The expandable repeater of claim 1, wherein the data and clock bus is connected to each repeater unit.

7. The expandable repeater unit of claim 1, wherein the plurality of repeater units and DNSI define a plurality of repeater groups.

8. The expandable repeater of claim 7, wherein the DNSI is included in the third repeater group and the fourth repeater group, the DSNI further comprising:
   a. a first input/output (I/O) for communication with one of the plurality of repeater units;
   b. a second I/O for communications with the third repeater group; and
   c. a third I/O for communications with the fourth repeater group.

9. The expandable repeater of claim 8, wherein the second I/O is configured to receive repeater group status signals from the first repeater group and to transmit fourth repeater group status signals to the first repeater group.

10. The expandable repeater of claim 8, wherein the third I/O is configured to receive repeater group status signals from the second repeater group and to transmit third repeater group status signals to the second repeater group.

11. The expandable repeater of claim 8, wherein the DNSI is configured to:
   a. generate the third repeater group status signals in response to the repeater unit status signals and the first repeater group status signals;
   b. generate the fourth repeater group status signals in response to the repeater unit status signals and the second repeater group signals; and
   c. generate the network status signals in response to the repeater unit status signals, the first repeater group status signals, and the second repeater group status signals.

* * * * *